United States Patent [19]

Eshraghi

[11] Patent Number: 5,286,151
[45] Date of Patent: Feb. 15, 1994

[54] BLIND FASTENER

[75] Inventor: Soheil Eshraghi, Irvine, Calif.

[73] Assignee: Textron Inc., Providence, R.I.

[21] Appl. No.: 981,018

[22] Filed: Nov. 24, 1992

[51] Int. Cl.⁵ .................. F16B 13/04; F16B 13/06; B23P 11/02
[52] U.S. Cl. ........................ 411/43; 411/45; 411/70; 29/524.1; 29/525.2
[58] Field of Search ............ 411/36, 43, 45, 50, 411/51, 69, 70; 29/524.1, 525.2

[56] References Cited

U.S. PATENT DOCUMENTS

| | | |
|---|---|---|
| 2,558,623 | 1/1951 | Keating . |
| 3,047,181 | 7/1962 | Heidenwolf . |
| 3,073,205 | 1/1963 | Siebol . |
| 3,136,204 | 6/1964 | Reynolds . |
| 3,286,580 | 11/1966 | Jeal .................. 411/70 X |
| 3,850,021 | 11/1974 | Binns . |
| 3,880,042 | 4/1975 | Binns . |
| 4,211,145 | 7/1980 | Dolch . |
| 4,236,429 | 12/1980 | Dolch . |
| 4,904,133 | 2/1990 | Wright .................. 411/70 X |
| 5,006,024 | 4/1991 | Siebol .................. 411/43 |
| 5,102,274 | 4/1992 | Norton et al. .......... 411/43 |

Primary Examiner—Neill R. Wilson
Attorney, Agent, or Firm—Knobbe, Martens, Olson & Bear

[57] ABSTRACT

A fastener mandrel has formed on one end a shoulder and a twisted, generally rectangular shaped head adjoining the shoulder. In setting the fastener in a workpiece, the shoulder enlarges the end of a tubular rivet and clamps workpieces together in combination with a preformed head on the other end of the rivet. The mandrel head deforms the rivet tail into a twisted appearing shape with a somewhat elliptical cross-section that partially encloses the mandrel head to provide good stem retention and prevent axial looseness. A plurality of axial ribs on the mandrel stem are drawn into a reduced diameter section of the rivet head end when the rivet is set, thereby providing additional stem retention and torsional interference.

19 Claims, 4 Drawing Sheets

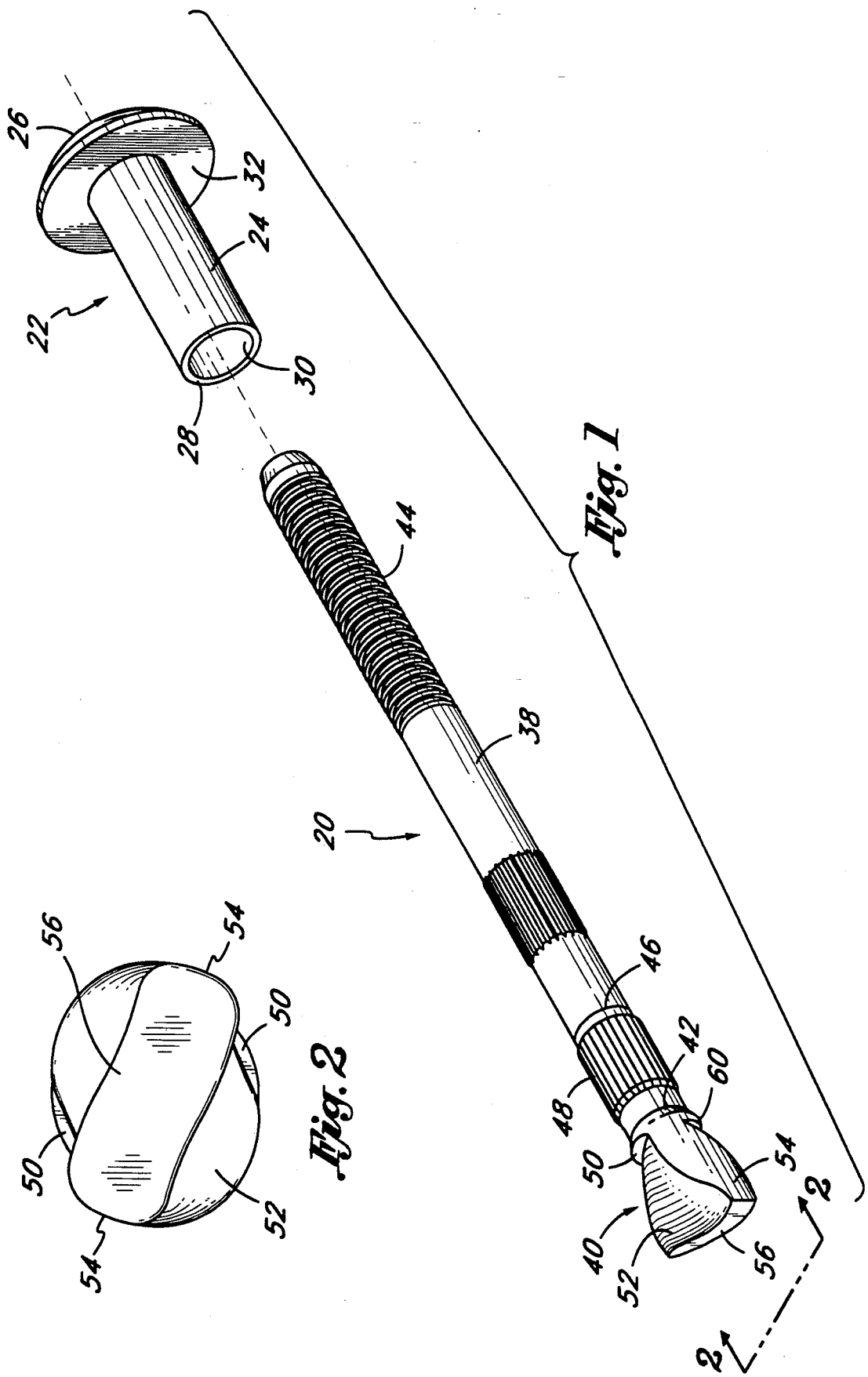

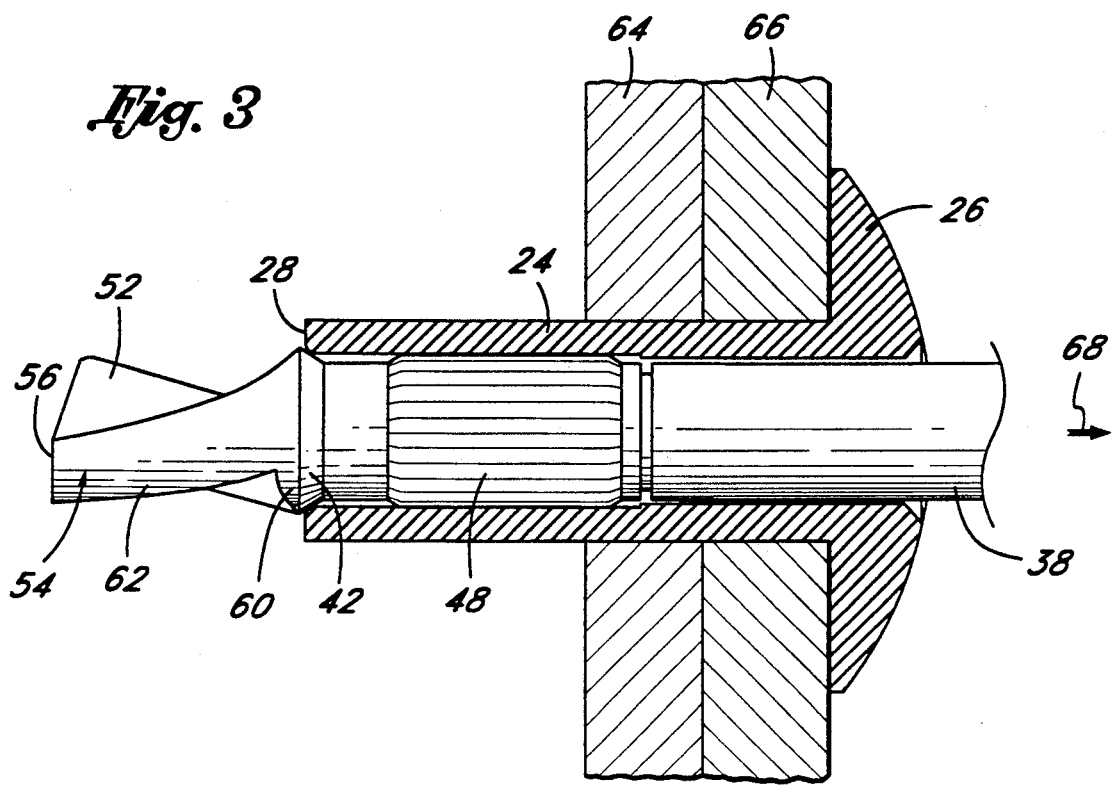
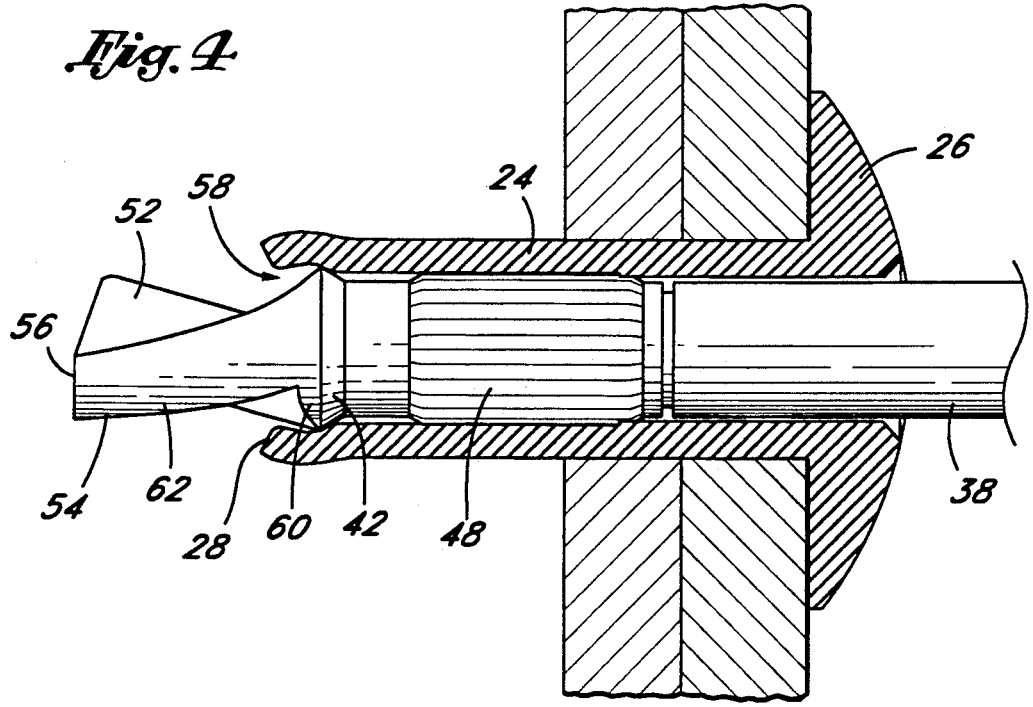

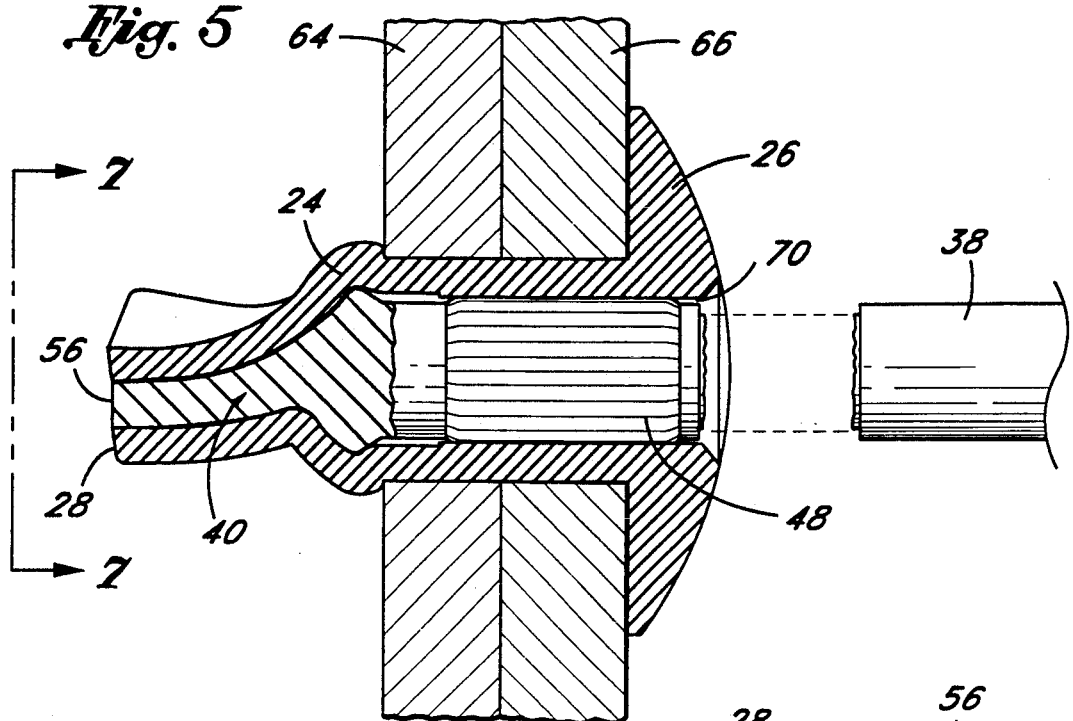
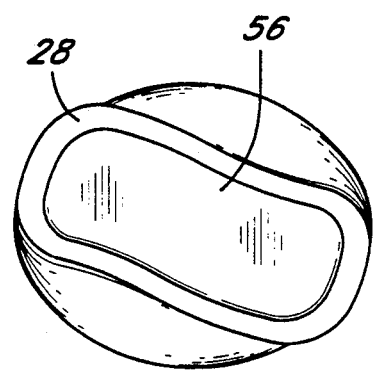
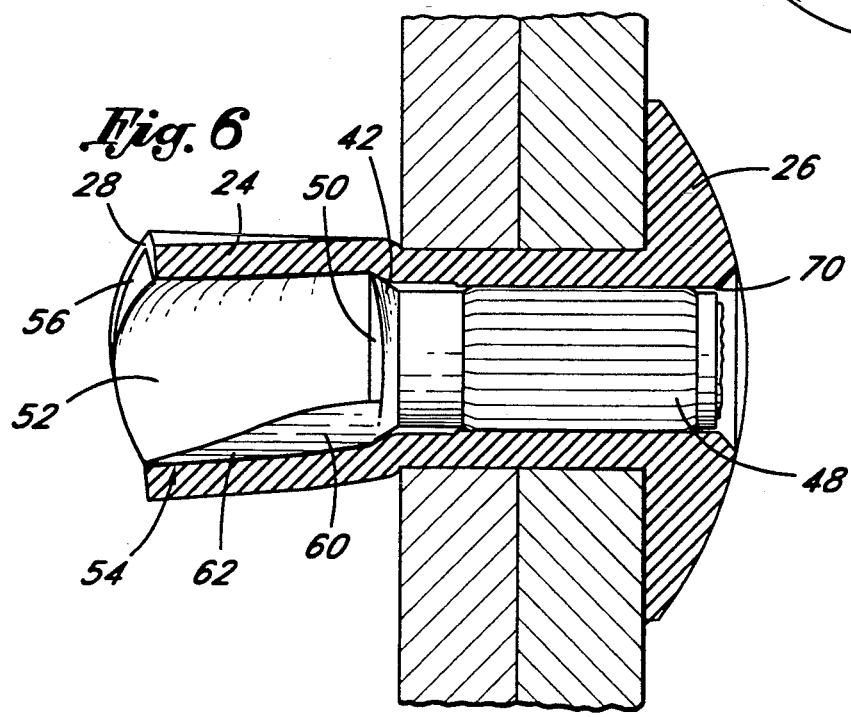

BLIND FASTENER

FIELD OF THE INVENTION

This invention relates to mechanical fasteners, such as blind rivets, wherein fastener installation is only accessible on one side, although the invention may be useful in non-blind situations as well. More particularly, the invention relates to improved means for retaining a fastener stem head in an installed fastener body.

BACKGROUND OF THE INVENTION

In the installation of a blind rivet, the combination of a tubular fastener body or sleeve with a cylindrical stem therein is inserted through aligned holes in two or more stacked workpieces. The sleeve typically has a preformed head on one end which engages one side of the combined workpiece and has a plain tubular configuration on its tail end protruding from the opposite side of the workpiece. The stem usually has an enlarged head which engages the tail end of the fastener sleeve and has an elongated portion protruding beyond the head end of the sleeve to be gripped by an installation tool. The stem is pulled by the tool so that its enlarged head deforms the tail of the sleeve. When the sleeve is thus set, further pulling on the stem causes it to break flush with the exterior of the sleeve head.

It is desirable that the portion of the stem extending through the sleeve remain captured in the sleeve in that the stem provides additional shear strength to the fastener, and in many installations it is not acceptable to have loose rivet stems confined within an inaccessible portion of the structure. In a three-piece blind fastener, a locking ring fits into a mating annular groove between the stem and the sleeve to lock the stem in the sleeve. Such a fastener is widely used and has many advantages, one advantage being that a given fastener can accommodate workpieces within a range of workpiece thicknesses in that the stem is wire drawn until a positive stop is reached.

However, a two-piece fastener, which is naturally less expensive, and which provides good stem retention without looseness, is needed. Various attempts have been made at attaining these goals, but only partial success has been obtained.

U.S. Pat. No. 5,102,274 - Norton, et al. discloses a blind fastener having a pull stem with an enlarged head and shoulder on one end to provide good stem retention characteristics. The enlarged shoulder on the stem has an outwardly flaring, preferably spherically curved forward surface that initially engages and enlarges the tail of the sleeve. A pair of sleeve expanding lips or protrusions that are diametrically spaced and protrude beyond the periphery of the shoulder deform the sleeve tail into a generally elliptical shaped cross section. Pulling of the stem into the sleeve allows the sleeve ends to curl inwardly into recesses between the lips to enclose and capture the stem head within the sleeve tail. The elliptical end portion, however, only generally conforms over the end of the stem head and a tight axial fit is not ensured. The stem is thus frequently loose within the rivet and left to rattle.

U.S. Pat. No. 3,047,181 - Heidenwolf discloses a two-piece blind fastener having an enlarged tail on its stem which appears to have a frusto-conical forward surface and a spherical rear surface. The patent indicates that . . . "the sleeve tail flows over the smooth surface of the terminal, spherical portion of the mandrel or stem and encloses the enlarged tail." However, there is further provided teeth at the extreme outer end of the sleeve to facilitate enclosing of the stem tail.

U.S. Pat. No. 3,073,205 - Siebol discloses a fastener having a tapered leading surface and the enlarged stem head is captured in the tail of the sleeve. However, the sleeve has an annular groove formed on its inner surface to provide the retention capability. Such a groove, of course, adds to the cost of the structure.

U.S. Pat. No. 4,211,145 - Dolch discloses a blind rivet having a stem with an enlarged cone-shaped head, and U.S. Pat. No. 4,236,429 - Dolch discloses a spherical tail. In each case, the heads are said to be captured within the end of the sleeve. However, these fasteners are made of thermoplastic material and an inwardly extending annular bead is formed on the extreme end of the sleeve to capture the stem head. It is said that this is accomplished because the thermoplastic material tends to return to its original shape after deforming pressure has been relaxed. For many applications, thermoplastic fasteners are, of course, not acceptable.

A two-piece blind fastener made by the Cherry Division of Textron Inc., and referred to as an "N-rivet," employs a stem having an enlarged head with a generally flat forward surface, a curved convex rear surface and a pair of opposing, generally flattened sides giving the enlarged head a somewhat elliptical cross-sectional shape. When a head with such shape enters the end of the sleeve, the sleeve tail cross section is deformed by being enlarged in the longer dimension of the stem head with the result that the adjacent sides of the sleeve tail are drawn inwardly and tend to curl over the end of the stem head, capturing it within the end of the sleeve. While such fastener is relatively inexpensive and is widely used for many applications, a better way of tightly gripping the stem within the rivet is desirable. This is particularly so if such result can be obtained without significant increased cost.

U.S. Pat. Nos. 3,850,021 and 3,880,042 - Binns disclose the use of axially spaced, outwardly extending, diametrically and axially spaced flanges on a fastener stem, and such flanges deform the end of a sleeve into non-circular shapes. However, it appears difficult to manufacture.

U.S. Pat. No. 3,136,204 - Reynolds discloses a two-piece blind fastener wherein a sleeve tail is deformed into a so-called tulip shape by a pin head having a conical surface and a crowned rear surface. The sleeve tail provides some limited stem retention capability, but apparently not enough because the sleeve head is also swaged into grooves on the stem.

U.S. Pat. No. 2,558,623 - Keating discloses a two-piece rivet assembly wherein a sleeve has a head section of reduced diameter and sleeve material is swaged into a groove in the stem for stem retention by a larger diameter pin section.

A need still exists for an improved, low cost, two-piece blind fastener having the capability to provide stem retention capability and tightly hold the stem in place relative to the rivet.

SUMMARY OF THE INVENTION

Briefly stated, the present invention comprises a blind fastener having a pull stem with a flat twisted head appearing on one end uniquely shaped to deform a fastener sleeve tail while being tightly held within the sleeve of the fastener. The initially tubular sleeve end assumes a twisted ellipsoid shape conforming to the shape of the stem head and is thus prevented from axial movement relative to the stem.

In one embodiment of the pull stem, an enlarged shoulder adjacent the stem head initially engages the tail of the sleeve. When the fastener is being installed, the shoulder enters and enlarges the sleeve while drawing the workpieces together. Rearwardly from the shoulder, outwardly facing edges of the twisted, generally rectangular head extend beyond the periphery of the shoulder. Initially, a transition region increases the width of the head across the diametrically opposed edges from that of the shoulder to a distance about equivalent to the outer diameter of the fastener sleeve, whereupon the width remains generally constant to the trailing end of the head. Diametrically opposed broad faces of the twisted head separate the projecting edges defining flutes or recesses into which the rivet sleeve may deform inwardly.

Pulling the stem to draw the shoulder and transition region into the tail of the sleeve deforms the sleeve tail into a generally elliptically shaped cross section with a major axis across the projecting edges and a minor axis across the flutes. Pulling the stem farther forces the twisted head into the tail of the sleeve and deforms the sleeve tail from one ellipsoidal shaped cross section to another, offset rotationally from the first. The tail of the sleeve continues to be deformed into newly oriented ellipsoid shapes as the head travels into the spiralling extremities of the head. The remainder of the sleeve tail experiences a similar deformation while the twisted head is forced into the sleeve. Further pulling of the stem into the sleeve deforms the sleeve tail into a generally twisted, elliptical configuration to enclose and capture the stem head within the sleeve tail.

Additional stem retention is obtained by providing increased interference between grooves on the stem and the inner diameter of the sleeve in the head end of the sleeve. Preferably, the serrations are axially aligned. This means of stem retention also helps prevent rotation of the entire sleeve about the stem as the tail experiences twisting deformation forces, such as during stem "push out" testing.

BRIEF DESCRIPTION OF THE DRAWINGS

FIG. 1 is an exploded perspective view of a preferred embodiment of the fastener of the present invention.

FIG. 2 is an enlarged elevational view of the head end of the mandrel along line 2—2 of FIG. 1.

FIG. 3 is a cut-away side view of a portion of the fastener of FIG. 1 installed in a workpiece but before being set.

FIG. 4 is a cut-away side view similar to FIG. 3 with the fastener partially set in a workpiece.

FIG. 5 is a cut-away side view of the fastener of FIG. 3 fully installed.

FIG. 6 is a cut-away top view of the fastener of FIG. 3 fully installed.

FIG. 7 is an end view of the rivet tail after installation along line 7—7 of FIG. 5.

DETAILED DESCRIPTION OF THE PREFERRED EMBODIMENT

Figure 8:
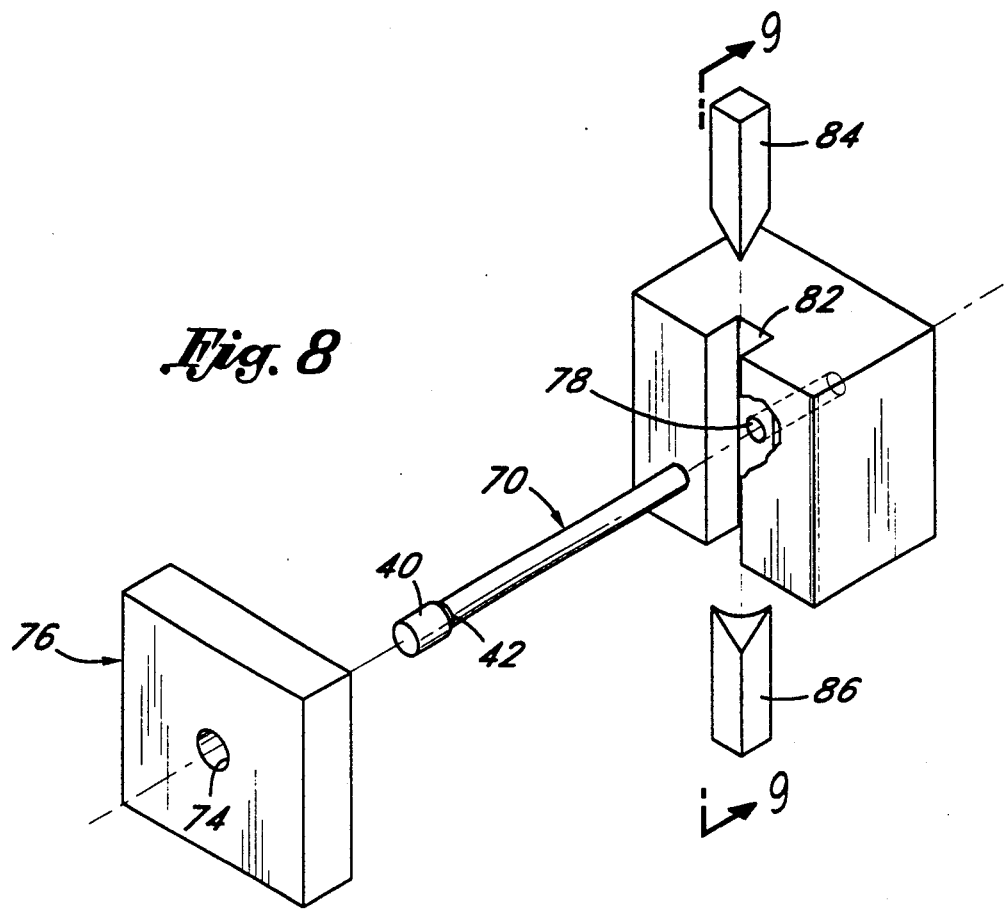
FIG. 8 is an exploded schematic, perspective view of an apparatus for forming the stem head of FIGS. 1-7.

Referring to FIG. 1, an elongated mandrel 20 is shown aligned with a tubular rivet body or sleeve 22, prior to installation in a workpiece. The rivet 22 includes a tubular shank 24 and an enlarged head 26 on one end, together with a cylindrical tail 28 on the other end. Extending through the rivet shank 24 and head 26 is a cylindrical cavity or bore 30 sized to receive the mandrel 20, which is inserted therein.

The mandrel 20 comprises a long cylindrical stem 38 culminating in a head 40 on one end, with a shoulder 42 therebetween. The stem 38 includes annular serrations 44 about a substantial portion of the end opposite the head 40, for installation gripping purposes. An annular notch or break groove 46 is located at a distance from the shoulder 42 approximately equal to the thickness of the two parts being joined. Between the break groove 46 and the shoulder 42 is a plurality of axial grooves and raised ribs, or serrations 48.

The leading surface of the shoulder 42 facing the grooves 48 has a diameter increasing from the stem 38 to a maximum, where it meets the head 40. The shoulder can have a conical surface, but preferably has a convex, preferably spherical, curvature. The shoulder 42 provides a leading surface for initiating expansion of the rivet tail 28 and facilitates workpiece clamp-up.

The head 40, as shown in FIGS. 2, 3 and 4, has a particular shape to facilitate the deformation of the rivet tail 28 upon installation that locks the stem to the pivot body. The shoulder 42 abruptly terminates with a ledge 50 facing the head 40 on two diametrically spaced sides. Each ledge 50 has the general shape of a circular segment, as seen in FIG. 2, bounded on its radially inward side by a broad face 52 of the head 40. The outer limits of the broad faces 52 terminate in edges 54 generally perpendicular to the faces. An end surface 56 bounds the trailing ends of the faces 52 and edges 54 generally perpendicular to the axis of the mandrel 20.

The projecting edges 54 comprise material expanders which deform the rivet tail 28. The two edges 54 extend radially beyond the diameter of the shoulder 42 and comprise a transition region 60 and a generally constant diameter region 62. The transition region 60 widens the distance across the edges 54 from the shoulder diameter 42 to the outer diameter of the rivet shank 24 and extends approximately ⅓ of the axial length of the head 40. The edges 54 are preferably rounded to prevent scoring or otherwise weakening of the rivet sleeve 22 by sharp edges in contact with the interior bore 30 of the shank 24.

As seen, the board faces 52 and the edges 54 have a spiral or twisted appearance, with the end surface 56 being circumferentially offset approximately sixty degrees relative to the portion of the head 40 immediately adjacent the shoulder 42. The axial height of the head 40 beyond the shoulder is preferable about equal to the diameter of the stem or 1D. Thus, each face 52 assumes a slightly concave twisted flute, intersecting the ledge 50 inward from the shoulder 42 diameter and continuing in a spiralling path to the end surface 56. As best seen in FIG. 4, the diametrically opposed flutes create a recess 58 for the rivet tail 28. It might also be said that the tail has an ellipsoid shape with an elliptical or racetrack shaped cross section.

The head 40 end surface 56 has a generally spherical curvature, and is bounded by the faces 52 and edges 54 which are twisted about the axis of the mandrel 20. The radius of curvature of the end surface 56 is considerably greater than the maximum radius of the shoulder.

With reference to FIGS. 3-7, the mandrel 20 is inserted into the bore 30 of the rivet 22 until the shoulder 42 engages the rivet tail 28. The outer diameters of the ribs forming the grooves or serrations 48 are slightly larger (perhaps about 0.002 inch) than the inner diameter of the rivet bore 30 adjacent the tail of the sleeves such that there is an interference or friction fit between the two components. This is desirable to keep them together during handling prior to installation. In addition, the serrations 48 provide a gripping interference to resist rotation of the sleeve 22 relative to the stem. The bore 30 in the sleeve 22 has a reduced diameter region 70 (preferably about 0.003 inch) with respect to the adjacent head end of the bore, further interfering with the serrations 48.

With the mandrel inserted within the rivet body, the stem 38 extends substantially from the rivet head 26 and is inserted into a standard installation tool (not shown), where the serrations 44 are engaged by clamping jaws of the installation tool. The rivet assembly is shown in FIG. 3 installed in aligned holes in workpieces 64 and 66, which are to be joined by the fastener. The fastener inserts until the face 32 of the rivet head 26 is flush with the visible surface of the plate 64. These being blind rivets, in a typical situation, only one of the components being assembled is accessible, or visible. Thus, in the arrangement shown, the rivet is inserted from the right side of FIG. 3 into a hole in the workpiece 66. During installation, the nose of the tool presses against the rivet head 26 while a pulling force is applied to the mandrel 20, as shown with the arrow 68. The mandrel shoulder 42 is thus drawn into contact with the sleeve tail 28.

FIG. 4 shows the mandrel shoulder 42 drawn partially into the sleeve tail 28, the shoulder gradually enlarging the sleeve tail. This, in turn, causes the exterior of the enlarging tail to press against the left side of the plate 64. If the plates 64 and 66 are separated with any gap, the expansion of the sleeve on the blind side will force the plates together, or to clamp up. This clamp-up action is facilitated by the spherical shape of the shoulder and provides better clamp up than fasteners having a more abrupt shoulder, for instance.

FIG. 4 also illustrates the transition region 60 of the projecting edges 54 initially being drawn into the sleeve tail 28. As the shoulder 42 is forced into the sleeve tail 28, the tail is enlarged symmetrically in a cylindrical shape. As the transition regions 60 are drawn into the tail 28, the tail is further deformed outwardly, but only in the diametrically opposed areas engaged by the transition regions. The arcuate sides of the tail 28 between the transition regions 60 experience circumferential tension and are pulled inward toward the recessed flutes 58 to conform to the shortest path between the outwardly projecting regions. Thus, the cross section of the tail 28 deforms into an ellipsoidal shape with a major axis across the transition regions 60 and a minor axis across the flutes 58.

As seen in FIG. 5, the twisted head 40 has been drawn fully into the rivet tail 28 causing the tail to deform and lock itself over the head. The tail 28 forms somewhat of an S-shaped ellipsoid proximate the end surface 56 of the head 40 and at a sixty degree angle from the initial ellipsoid formed by the transition region 60. The constant diameter region 62 of the projecting edges 54 continues distally from the transition region 60 in the aforementioned spiral configuration. As the tail 28 advances over the projecting edges 54, the spiraling edges deform the tail into somewhat of an S-shaped ellipsoids identical in shape but having major axes at different angles of rotation. The majority of the shank 24 trails behind the tail 28 to similarly conform to the twisted appearing head 40 resulting in a continuous series of elliptical shapes around the head from the end surface 56 to the shoulder 42. As stated above, the major axis of the ellipsoid proximate the end surface 56 is preferably rotated sixty degrees from the major axis of the ellipsoid at the shoulder 42.

FIG. 5, shows the inward curl of the ellipsoidal shape of the tail 28. The sleeve tail 28 thus encloses the head 40. This closure prevents the mandrel from falling out of the installed fastener. Since the workpieces 64 and 66 have been clamped together, and since the shoulder does not enter the workpiece, increased pulling load on the mandrel stem will cause it to break at the break groove 46, approximately flush with the exterior of the rivet head 26. The reduced bore portion 70 firmly interferes with the outwardly extending serrations 48 providing further stem retention.

FIG. 6, viewed 90 degrees from FIG. 5, shows the broad face 52 terminating in the material expanding edges 54. The transition region 60 widens the tail 24 into an ellipsoid shape after the sleeve has been symmetrically expanded by the shoulder 42.

In addition to simple retention of the mandrel 20 by the rivet 22, the final twisted ellipsoidal contour of the tail 28 conforms closely to the head 40 to prevent relative axial movement therebetween. The head 40 is restricted from axial movement within the tail 28 by the narrowed sides of the tail 24 as they change orientation in an axial direction. Once the tail 24 has been formed over the head 40, the mandrel 20 is tightly held in place, preventing rattling associated with looseness of prior fasteners.

Tests to push the mandrel head out of the installed rivet have been conducted in comparison with the N-rivet. These revealed that the peak load required to push the mandrel head of the present invention out of the sleeve was found to be about double the value for the N-rivet, referred to above. These mandrel retention results are, of course, very desirable and were surprising since the N-rivet provides a somewhat elliptical shaped end on the installed sleeve tail.

In addition to the retention provided by the twisted tail, there is frictional retention provided by the serrations 48 and the sleeve bore 30. More importantly, the interference between the stem and the sleeve resists relative rotation when rotational forces are applied to the fastener as might occur from vibration. As noted above, the internal diameter 70 of the sleeve head 26 is slightly smaller than the rest of the sleeve internal diameter. In a prototype product, the initial outer diameter of the ribs 48 is about 0.005 inches greater than the inner diameter of the sleeve head end section 70. Thus, as the stem ribs 48 are drawn further into the reduced diameter head section 70, additional mandrel retention is obtained. There can be some spring back force when the stem breaks at the break groove. The interference between the stem 38 and the sleeve 22, resists such spring back movement. Axial ribs are particularly desirable because they seem to best resist rotating when the sleeve 22 is subjected to torsional forces from the twisted head 40 of the mandrel.

Figure 9:
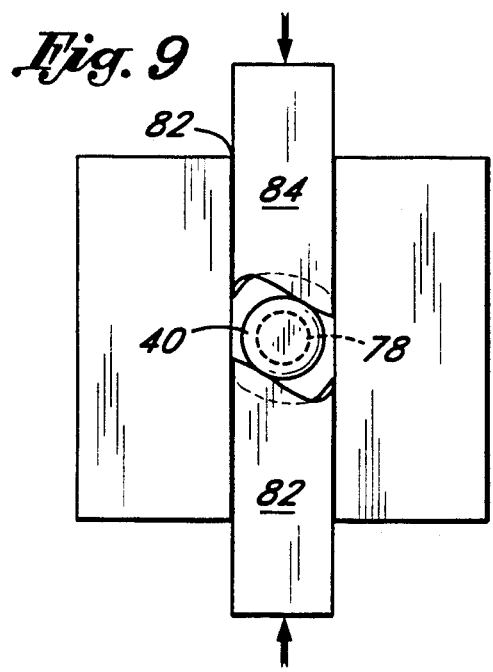
FIG. 9 is a schematic cross section on lines 9—9 of FIG. 8 before the head is formed.
Figure 10:
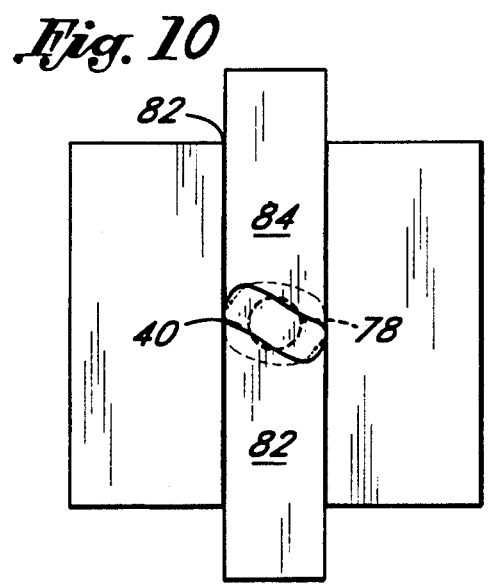
FIG. 10 is an enlarged fragmenting view on lines 9—9 of FIG. 8, after the head is formed.

FIGS. 8-10, schematically illustrate a preferred method and apparatus for fabricating the stem head 40. As an initial conventional step, a stem metal rod 70 is compressed or headed on one end to form an enlarged cylindrical end 72 interconnected by a shoulder 42 to the smaller diameter initial rod. Next the rod is inserted through a hole 74 in a die housing cap 76 and a hole 78 in a mating die housing 80. The holes are aligned with a vertical slot 82 in housing 80, with the slot having a rectangular cross-section. The diameter of the hole in the bottom housing is slightly smaller than the width of the slot. In a successful prototype of the fastener head of the invention, the large diameter rod end was 0.200 inches and the width of the slot was 0.250 inches. An upper die 84 and a lower die 86 are positioned in the slot on opposite sides of the rod end 72, as shown in FIG. 9. The mating faces of the dies are formed to provide the desired twisted or spiral appearance of the stem head as shown in FIGS. 1-7.

The dies are pressed towards each other to deform the rod end. This action causes the rod end to compress so that side edges of the rod are squeezed or bulged outwardly into engagement with the side walls of the slot, as shown. Also, in FIG. 10, this action causes the edges adjoining the shoulder to taper to create the transition area 60 as discussed above. In other words, the walls of the slot confine or limit the diameter of the deformed head. This creates generally parallel side edges adjacent the outer face 56 of the large end, but at the end adjacent the shoulder 42, the side edges taper outwardly to create the transitional area. It should be noted that the ledges 50, referred to above, are also formed in this forming operation. In other words, once the large diameter portion of the rod end has been formed, the remainder of the head is formed in this one stamping or compressing operation.

As noted above the ends of the finished stem head are circumferentially offset with respect to each other. The degree of twist or spiral which can be imparted to the head is limited with this one step stamping operation. That is, if the end face of the stem head were desired to be 180° circumferentially offset with respect to a portion of the head adjacent the shoulder, such a configuration could not be formed in a single stamping operation. Moreover, it should be noted that a 60 degrees offset is about all that is desired in that if the offset is too large, the stem head will be essentially like a drill and would simply enlarge the sleeve tail rather than conforming it into its spiral or ellipsoid configuration. If the offset is too small, the stem will not be locked so well in the sleeve.

The dies in a successful prototype operation were uniquely formed by initially starting with a single elongated die element having a square cross-section as shown in FIG. 8. This element was cut into the upper and lower dies by an electron-discharge machining operation wherein the element was moved through a curved electric discharge machining or cutting path in a manner to create the smooth slightly curved die faces illustrated in the drawing. This approach produces two completely matched die faces. The die faces may of course be formed by other means, such as mechanical machining.

I claim:

1. A blind fastener, including a tubular rivet body having a shank for extending through a workpiece with a tail protruding beyond the workpiece, a stem extending through said rivet body having an enlarged portion on one end which is larger than the inner diameter of said shank, the improvement wherein:
   said stem portion has a forward facing shoulder adapted to engage and enlarge said tail and draw workpiece panels together as the stem portion is drawn towards the workpiece during a fastener setting operation,
   said stem portion further having a head with outwardly extending, spaced deforming edges to the rear of said shoulder which have a diameter larger than said shoulder so that when said edges engage said body tail, they further enlarge the body tail in the area of engagement, said edges extending circumferentially about only a portion of said stem head and being positioned to cause said tail to enlarge in diameter in one transverse direction, said stem head further having recesses between said edges to permit portions of said tail between said edges to deform inwardly to a reduced diameter, said edges and said recesses further being twisted in appearance about the longitudinal axis of said stem to cause said tail to conform to the shape of the stem head, and thereby capture the stem head to restrict it from moving axially relative to the rivet body.

2. The fastener of claim 1, wherein said stem head is formed to produce a generally elliptical cross section at any one axial position along the tail of the rivet body, with the smaller diameter of such cross section being sufficiently small to resist axial movement of the stem after the rivet is set.

3. The fastener of claim 2, wherein said shoulder has a convex configuration.

4. The fastener of claim 3, wherein said convex configuration has a substantially spherical curvature.

5. The fastener of claim 1, wherein said edges are on opposite sides of the stem head and have rounded surfaces.

6. The fastener of claim 1, wherein the width of said head is slightly greater than the diameter of said stem.

7. The fastener of claim 1, wherein said stem diameter includes portions within the rivet body which are slightly larger than the interior diameter of said rivet body so that friction between the two components is maintained and must be overcome to separate the components.

8. The fastener of claim 7, wherein the rivet body inner diameter in the area of a head on said rivet body is reduced relative to the area between said reduced area and the rivet tail so that the frictional interference between the components is increased as the rivet is set in a workpiece.

9. The fastener of claim 8, wherein the portion of said stem in said body has a plurality of axial grooves that enhance the axial and torsional holding forces between the stem and the rivet body.

10. The fastener of claim 1, wherein said stem head has an elongated generally rectangular cross-section with rounded corners.

11. The fastener of claim 1, wherein the cross-sectional shape of the ends of the stem head are similar to each other but are circumferentially offset about 60° with respect to each other.

12. The fastener of claim 1, wherein the axial length of said stem head is about equal to the diameter of the stem.

13. A blind fastener, comprising:

a tubular rivet body adapted to fit through a hole in a workpiece, said body having a head to engage one side of the workpiece and a tail to protrude beyond the other side of the workpiece; and an elongated stem extending through said body having an enlarged shoulder and head on one end, said shoulder sloping outwardly and being sufficiently larger than the inner radius of the body tail so that the body tail is enlarged outwardly when the stem is drawn in the direction to urge the stem shoulder to engage and enlarge the tail, said stem head including diametrically spaced deforming edges adjacent the shoulder which provide a generally elliptical cross-section shape wherein said edges extend in the direction of a larger dimension of said elliptical shape and extend beyond the outer diameter of said shoulder in position to further engage and deform the tail when the stem is drawn to the position where said edges engage the tail, a smaller dimension of said head shape having an outer diameter no greater than that of the adjacent shoulder, and said head having a twisted appearance about the stem axis in a rearward direction so that when said edges engage said tail, the tail is deformed into a somewhat twisted appearing shape that conforms to said head and the deformed tail captures the stem head and restricts axial movement.

14. A blind fastener, comprising:

a tubular rivet body having a head on one end and a tail on an opposite end, said body having a cylindrical bore with a head end section which has an inner diameter which is slightly smaller than the inner diameter of said tail; and an elongated stem extending through said bore, the stem having a head with a twisted rectangular appearance on one end for enlarging said tail in one diametrical direction and causing the tail to conform to said head when the stem is pulled partially into said bore by means of a stem portion protruding beyond the head end of said body, said stem having an interfering portion which, when drawn into said rivet body head end, produces with said head end section significant friction for resisting rotational movement of said stem within said rivet body.

15. The fastener of claim 14, wherein said stem interfering portion includes a plurality of axial serrations on its exterior between said stem head and a break grove in said stem, said serrations having an exterior diameter which is larger than the inner diameter of said head end section.

16. The fastener of claim 14, wherein the outer diameter of said serrations is also larger than the inner diameter of said body tail.

17. A blind fastener including a tubular rivet body for extending through a workpiece, a stem extending through said rivet body having an enlarged portion on one end which is larger than the inner diameter of a tail of said body, said stem portion including a forward facing shoulder which is adapted to engage said tail and draw panels forming the workpiece together as the stem portion is drawn towards the workpiece during a fastener setting operation, said stem portion further having a head with a generally flattened but twisted appearing shape having two large opposite sides joined by two opposite smaller edges, the diametric dimension of said longer sides tapering smoothly from said shoulder and outwardly to a generally constant diameter which is larger than the diameter of the shoulder so that the sleeve tail is deformed outwardly by engagement with said edges, the thickness of the head between said longer sides being appreciably less than the diameter of said shoulder such that ledges having somewhat the shape of circular segments are formed on the back side of said shoulder adjacent said longer sides, the axial ends of said head being circumferentially offset with respect to each other in an amount which will cause said sleeve tail to conform to the exterior shape of said head and will prevent said stem from being axially pushed out of said tail without relative rotation between the stem head and said tail.

18. A method of fastening pieces together with a fastener including a tubular sleeve with a tail on one end and an enlarged head on the other end, and a stem extending through the sleeve having a head extending beyond the sleeve tail and a tail protruding beyond the sleeve head, said method comprising the steps of:

aligning apertures in two or more pieces to be joined;

inserting said fastener from a first side of said pieces through said apertures so that said stem head and said sleeve tail extend beyond a second side of said pieces;

pulling said stem tail from said first side so that said stem head deforms the sleeve tail into a spiral ellipsoid configuration until said stem tail breaks off, leaving the remaining portion of said stem axially held within said sleeve.

19. The method of claim 18, including the further step of:

creating an interference between serrations on said stem and a small diameter region of said sleeve.

* * * * *